United States Patent [19]
Frühauf et al.

[11] Patent Number: 5,149,067
[45] Date of Patent: Sep. 22, 1992

[54] BEARING

[75] Inventors: Frank Frühauf, Eitorf; Wilhelm Mayerböck, Kirchdaun; Jörn-Rainer Quast, Bad Bodendorf, all of Fed. Rep. of Germany

[73] Assignee: Boge AG, Eitorf, Fed. Rep. of Germany

[21] Appl. No.: 688,381

[22] Filed: Apr. 19, 1991

Related U.S. Application Data

[63] Continuation of Ser. No. 442,139, Nov. 28, 1989, abandoned.

[30] Foreign Application Priority Data

Dec. 7, 1988 [DE] Fed. Rep. of Germany ....... 3841194

[51] Int. Cl.⁵ ............................................. F16F 13/00
[52] U.S. Cl. ............................... 267/140.13; 180/312; 248/562; 248/636; 267/140.5; 267/219; 403/132; 403/133; 403/140
[58] Field of Search ................. 267/140.1 R, 140.1 A, 267/219, 220, 140.5, 141.3, 153, 292; 180/300, 312, 902; 248/562, 636; 403/132, 133, 140

[56] References Cited

U.S. PATENT DOCUMENTS

| | | | |
|---|---|---|---|
| 2,361,025 | 10/1944 | Graham et al. | 403/133 X |
| 2,562,195 | 7/1951 | Lee | 248/358 |
| 4,215,842 | 8/1980 | Brenner et al. | 248/562 |
| 4,234,172 | 11/1980 | Takahashi | 267/220 |
| 4,244,240 | 1/1981 | Rabenhorst | 74/572 |
| 4,288,063 | 9/1981 | Brenner et al | 267/8 R |
| 4,352,487 | 10/1982 | Shtarkman | 248/562 X |
| 4,399,987 | 8/1983 | Cucelli et al. | 267/140.1 A |
| 4,424,961 | 1/1984 | Takei | 267/64.27 |
| 4,535,976 | 8/1985 | Dan et al. | 248/562 X |
| 4,712,940 | 12/1987 | Wood, Jr. | 403/133 |
| 4,721,291 | 1/1988 | Makihayashi et al. | 267/140.1 |
| 4,753,421 | 6/1988 | Makibayashi et al. | 267/140.1 |
| 4,760,996 | 8/1988 | Davis | 267/122 |
| 4,781,361 | 11/1988 | Makibayashi et al. | 267/140.1 |
| 4,817,925 | 4/1989 | Sprang et al. | 248/636 X |
| 4,905,956 | 3/1990 | Zemlicka et al. | 267/140.1 A X |
| 4,927,285 | 5/1990 | Kotz et al. | 403/133 |

FOREIGN PATENT DOCUMENTS

| | | |
|---|---|---|
| 1260886 | 2/1968 | Fed. Rep. of Germany . |
| 1525312 | 11/1969 | Fed. Rep. of Germany . |
| 1630303 | 5/1971 | Fed. Rep. of Germany . |
| 1935542 | 7/1980 | Fed. Rep. of Germany . |
| 3725404 | 8/1989 | Fed. Rep. of Germany . |
| 1167010 | 10/1967 | United Kingdom . |

Primary Examiner—George E. A. Halvosa
Attorney, Agent, or Firm—Nils H. Ljungman and Associates

[57] ABSTRACT

A bearing which includes an inner part and an outer part arranged in spaced apart relation. In between the inner part and the outer part is a rubber, or resilient, part which can be loaded axially for tension and/or compression and which permits cardanic loads with very little restoring torque. The rubber part, together with the inner part and the outer part, form a cavity which is filled with fluid which transfers corresponding load capacities in the main load direction.

21 Claims, 1 Drawing Sheet

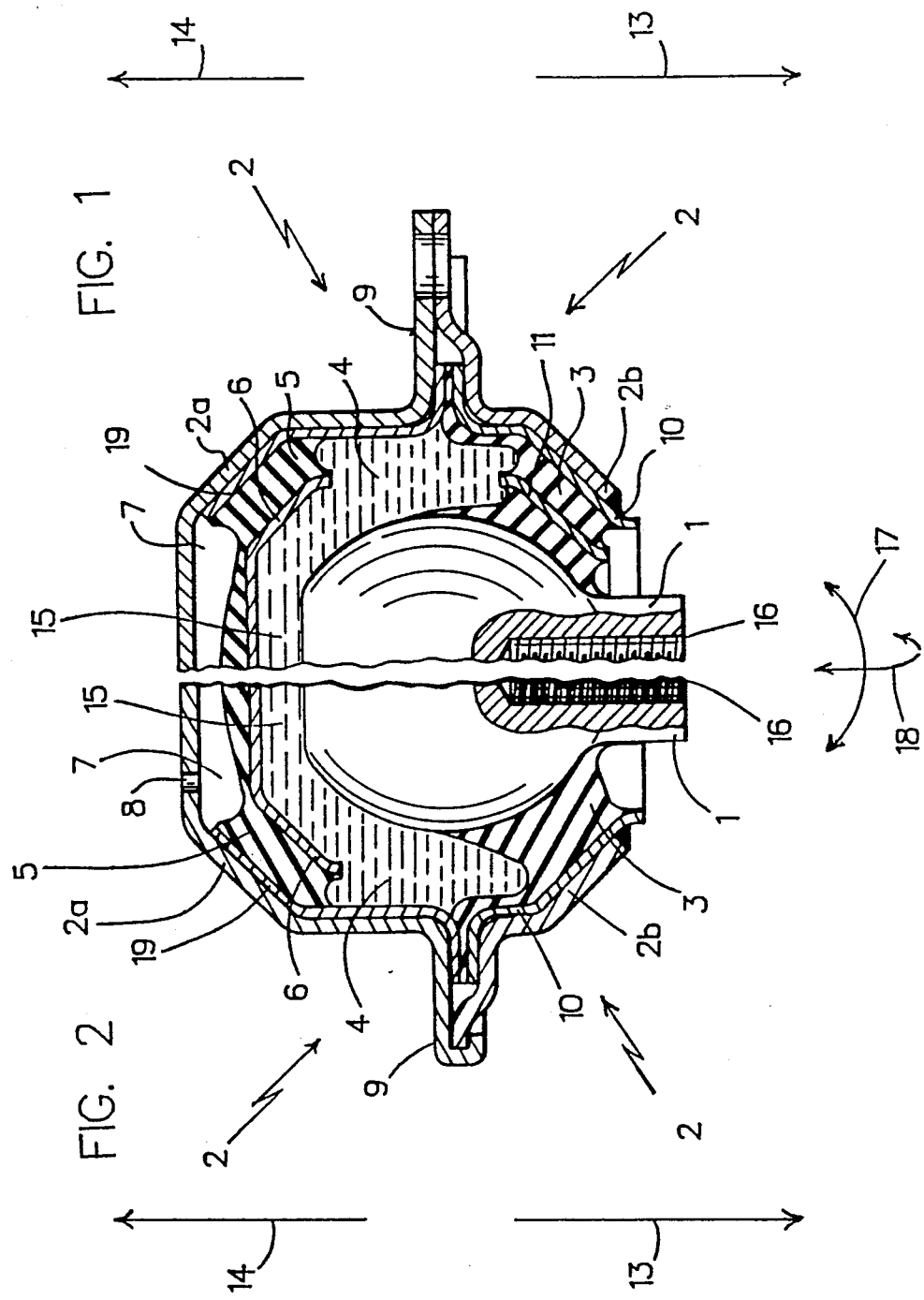
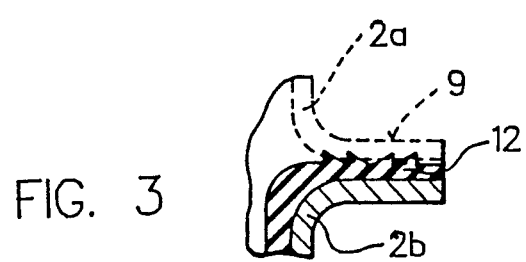

BEARING

This application is a continuation of U.S. application Ser. No. 442,139, filed on Nov. 28, 1989, now abandoned.

BACKGROUND OF THE INVENTION

1. Field of the Invention

This invention relates to an elastic, or resilient, bearing comprising an inner part and an outer part. The outer part is positioned in spaced apart relation with respect to the inner part. The bearing may have an inserted rubber, or resilient, part which cooperates with the inner part and the outer part to form a cavity filled with fluid. The fluid provides dampening action.

2. Description of the Prior Art

Elastic or resilient bearings are well known. U.S. Pat. No. 2,562,195, for example, discloses a bearing having ring-like cavities that are bordered by an outer ring, which is angle-shaped in its cross section, and an inner ring which is made from elasto-type materials. The inner ring of both cavities is developed as a common ring. However, bushings and carrying elements provide an undesirable restriction, or obstruction, in the cavity. The cavity, therefore, is divided, somewhat, into two chambers. The disadvantages of this design are twofold. The bearing can carry only a small load in the axial, static direction. In the radial direction, only a relatively small travel stroke is possible.

OBJECTS OF THE INVENTION

It is an object of the invention, therefore, to provide an elastic, or resilient, bearing which may be made of rubber and which can be loaded axially both in tension or compression.

A further object of the invention is to provide a bearing whose cardanic, or non-axial or rotational, movement causes very little restoring torque to be generated.

SUMMARY OF THE INVENTION

In one embodiment of the invention, the transfer of force between the inner and the outer parts of the bearing is accomplished, primarily, through a fluid.

It is advantageous, with the present invention, that the rubber, or resilient, part, as well as the fluid, can sustain increasing static forces without substantial problems occurring. By properly geometrically forming, or constructing, the shape of the rubber, or resilient, part, a corresponding force carrying capacity can be achieved to allow cardanic movements to be executed without problems, such as those associated with return force or torque. During cardanic movements, the rubber part is primarily strained in the direction of shear rather than compression. The rubber part is softer in such a direction of shear, than in the direction of compression, so that the restoring, or return, torque, which tends to return the inner part to its initial position after being moved therefrom, is minor.

One embodiment of the invention provides that the inner part be in the shape of a ball, or a ball pin, and the outer part be, preferably, in the shape of a cylinder which is enclosed on one side. The rubber part is, advantageously, fastened in such a manner that cardanic movement causes as little restoring torque between the inner part and the outer part as possible, even under high carrying capacity, or forces.

It is advantageous if the rubber part act as a carrier spring as well as a seal of the fluid between the inner part and the outer part. The fluid is, preferably, located between the inner part and the outer part and transfers static and dynamic forces while still allowing cardanic movement with little or relatively small restoring torque.

Another embodiment of the invention provides, in a compression direction, an additional rubber element which may be positioned and attached to the outer part and braced against the inner part by fluid. It is advantageous that the rubber element be developed in a ring-like shape and, together with a metal part and the outer part, form a chamber which may be filled with a gas, such as air.

With this embodiment, it is advantageous that forces be accepted elastically, or resiliently, by means of the rubber element. The fluid braces itself, by means of the metal part, against the rubber element so that the suspension travel of the rubber element and the rubber part is effective.

In certain applications, it is advantageous if the compression force in the chamber be limited to a particular pressure. Therefore, one embodiment of the invention provides a vent, or bore, so that the chamber may be vented to the outside. However, an increase of compression in the chamber can contribute to the support of the load, especially with high static loads.

According to another embodiment, which is especially advantageous for technical production, the outer portion of the bearing is constructed of two parts and the parts are joined and sealed together. Overflow, or excess, rubber of the rubber part, or element, can be utilized to serve as the seal, or as a gasket, between the two outer parts.

In a further embodiment of the invention, the outer part has a ring-like mounting flange. The flange is formed by crimping two portions of the outer part together.

In summation, one aspect of the invention resides broadly in a bearing for being mechanically connected between a first object and a second object for transferring a force between the first object and the second object, with the bearing comprising an external element device for being connected to the first object, an internal element device which defines a linear axis for being connected to the second object and being positioned in space-apart relation with and at least partially surrounded by the external element device, and fluid force transmission apparatus in communication with the internal element device and the external element device for at least transmitting a force between the internal element device and the external element device when the internal element device moves in relation to the external element device.

BRIEF DESCRIPTION OF THE DRAWINGS

The following Description of the Preferred Embodiments of the invention may be better understood when taken in conjunction with the appended drawings in which:

FIG. 1 is a partial cross-sectional, side elevational view of the present invention;

FIG. 2 is a partial cross-sectional, side elevational view of another embodiment of the invention; and FIG. 3 is a detailed, cross-sectional, side elevational view of a seal of the devices shown in FIGS. 1 and 2.

DESCRIPTION OF THE PREFERRED EMBODIMENTS

The elastic, or resilient, bearing shown in FIG. 1 comprises inner part 1, outer part 2 and rubber, or resilient, part 3, which is positioned between inner part 1 and outer part 2. Inner part 1, part 3 and outer part 2 define cavity 4, which is, preferably, filled with fluid. Outer part 2 comprises parts 2a and 2b. Part 3 is, preferably, vulcanized to inner part 1 and to outer part 2b. If desired intermediate sheet metal 10 can be provided which may provide additional strength or support.

Part 3 transfers the corresponding forces in the compression and tension directions, shown by arrows 13 and 14 respectively, between inner part 1 and outer part 2. Part 3 may, also, absorb some of the force. Fluid 15, in cavity 4, transfers and absorbs compression forces between inner part 1 and outer part 2. Part 3 is, generally, circumferential and may encompass the entire periphery of inner part 1 and outer part 2. Part 3 can, additionally, be equipped with reinforcement part 11, if desired, which may provide additional strength or support.

Static and dynamic loads can be elastically, or resiliently, cushioned by rubber, or resilient, element 5. Element 5 may be vulcanized to outer part 2a by means of an intermediate sheet 19 which is made of sheet metal. Also provided is metal piece 6, which facilitates the transfer of compression forces to element 5 by means of a correspondingly large area of metal part 6. Air, or gas, filled chamber 7 may be positioned between metal piece 6 and outer part 2.

Outer parts 2a and 2b include fastening flange 9, which may include mounting holes, if desired, for mounting outer part 2 to an object. Threaded member 16 may be provided for mounting inner part 1 to another object.

FIG. 2 illustrates another embodiment of the invention. With this embodiment, chamber 7 is vented outside to the atmosphere through bore, or vent, 8, located in outer part 2. Vent 8 allows little or no pressure to build up in chamber 7.

In FIG. 3, a cross section of mounting flange 9 is shown where the over-run, or excess, rubber or vinyl of part 3 and element 5 forms seal or gasket 12. The surface of seal 12 can be formed in a saw-tooth manner so that a faultless and, generally, leakproof seal between parts 2a and 2b is provided.

Thus, it may be appreciated that the present invention provides a bearing which may advantageously accept forces in the direction of, for example, arrows 13 and 14 while still allowing relatively unrestricted cardanic movement, such as that provided along arcs 17 and 18. Arcs 17 and 18 may be orthogonal to each other. In the case of movement by inner part 1, in the direction of arrow 14, fluid 15, in cavity 4, transmits at least a portion of the force from inner part 1 to outer part 2. Such transmission of force may occur through rubber, or resilient, element 5 and metal part 6. Part 3, during such movement of part 1, is placed out of compression and in at least partial tension. Since part 3 is, preferably, vulcanized to inner part 1 and outer part 2, part 3 may provide somewhat of a return biasing force in the direction of arrow 13. Part 3, also, tends to absorb some of the force from inner part 1. Thus, when inner part 1 is moved in the direction of arrow 14, fluid 15 and part 3, both, serve to absorb or counteract at least some of the force from inner part 1. Fluid 15 and part 3 may, also, transfer at least some of the force to outer part 2 through the compression of fluid 15 and the stretching, or tension, action of part 3 against outer part 2.

When inner part 1 is moved in the direction of arrow 13, part 3 becomes compressed against outer part 2, and, therefore, the force transmitted from inner part 1 is at least partially absorbed by part 3 and at least partially transferred to outer part 2. When inner part 1 moves in the direction of arrow 13, fluid 15 provides minimal force absorption or transfer.

If inner part 1 is moved in a direction other than along arrows 13 and 14, such as in the direction of arcs 17 and/or 18, then such cardanic movement will produce different results than when inner part 1 is moving in the direction of arrows 13 and 14. When inner part 1 is moving in the direction of arcs 17 and/or 18, inner part 1 applies, primarily, a shear force to part 3, rather than a tension or compression force. As is known in the art, when such a shear force is applied to a material, such as that used to produce part 3, very little return force or torque is applied by part 3 to inner part 1. Thus, when inner part 1 is moved in a cardanic manner, such as along arcs 17 and/or 18, inner part 1 does not have much, if any, of a tendency to return to its initial position since part 3 provides very little, if any, force, or torque, to return inner part 1 to such a position. Likewise, fluid 15, in cavity 4, provides very little, if any, return force or torque to return inner part 1 to its initial position.

Thus, it may be seen that the bearing of the present invention is capable of providing differing amounts of return forces, or torque, to inner part 1 depending on the motion of inner part 1 relative to outer part 2. When inner part 1 is moved in the direction of arrows 13 or 14, then relatively sufficient forces are provided to return inner part 1 to its initial position. However, when inner part 1 is moved in the direction other than along arrows 13 and 14, such as along arcs 17 and/or 18, then relatively little force is provided to restore inner part 1 to its initial position since the shear forces provided to part 3 do not provide for a relatively large return force or torque.

Numerous features of the present invention are inherently clear from the drawings. First, it will be appreciated that cavity 4 forms a substantial indentation in part 3. Each of cavity 4 and part 3 extends in a generally circumferential direction about inner part 1. It can be seen that the cavity 4 has a maximum circumferential extend about inner part 1 and the part 3 has a minimum circumferential extend about inner part 1. Furthermore, the indentation formed by cavity 4 in part 3 may have an apex, wherein this apex at least partially defines the maximum circumferential extent of the cavity 4 about inner part 1.

As shown, part 3 preferably has a region of reduced thickness defined by the indentation formed by cavity 4 in part 3 and by intermediate sheet metal 10, which sheet metal is disposed upon outer part 2. Additionally, for reference purposes, element 5 has a central portion located between metal part 6 and chamber 7. This central portion of element 5 has a generally convex shape oriented towards chamber 7.

For reference purposes, inner part 1 may be considered to have an upper area, located generally towards element 5, and a lower area, located substantially opposite the upper area. Thus, as shown, the part 3 preferably has a region of tapered thickness towards the upper area of the inner part 1. The region of tapered thickness is thus defined by the inner part 1 and the indentation formed by the cavity 4 in part 3.

The indentation formed by the cavity 4 in part 3 may be considered as having two walls, wherein one wall is formed by the region of tapered thickness of part 3 and the other wall is formed by the region of reduced thickness of part 3.

As shown, part 3 preferably has a region of substantial thickness between inner part 1 and outer part 2, at the lower area of inner part 1. Furthermore, part 3 and inner part 1 preferably define at least one open cavity, wherein, with respect to part 3, the at least one open cavity is disposed generally opposite cavity 4. The at least one open cavity preferably forms a convex indentation in part 3.

Finally, in particular reference to FIG. 3, parts 2a and 2b of outer part 2 preferably define a junction at the area at which they intersect. Seal or gasket 12 is preferably located within this junction.

Patents relating to engine mount devices include U.S. Pat. No. 4,424,961, entitled "Engine Mounting For Suspending Engine Relative To Vehicle Structure" and U.S. Pat. No. 4,288,063, entitled "Rubber Elastic Engine Mounts Or Supports With Hydraulic Damping, Especially For Engine Suspensions In Motor Vehicles."

Patents relating to vibration dampening devices include U.S. Pat. No. 4,781,361, entitled "Vibration-Preventing Rubber Device," U.S. Pat. No. 4,760,996, entitled "Damper and Isolator," U.S. Pat. No. 4,753,421, entitled "Vibration-Preventing Rubber Device," U.S. Pat. No. 4,721,291, entitled "Vibration-Preventing Rubber Device," U.S. Pat. No. 4,244,240, entitled "Elastic Internal Flywheel Gimbal" and U.S. Pat. No. 4,215,842, entitled "Rubber Elastic Engine Mounts Or Supports With Hydraulic Damping."

In summary, one aspect of the invention resides broadly in a process for the manufacture of an elastic rubber bearing consisting of an inner part, an outer part and a rubber part which is arranged with a distance in between.

Another aspect of the invention resides broadly in the fact that there is an inserted rubber part which, together with the inner and outer part, forms a cavity which is filled with liquid.

Yet another aspect of the invention resides broadly in the fact that the transfer of force between the inner part 1 and the outer part 2 is primarily accomplished by means of fluid.

A further aspect of the invention resides broadly in the fact that the inner part 1 has been developed into a ball pin whereby the outer part 2 is developed cylindrically and is enclosed on one side.

A yet further aspect of the invention resides broadly in the fact that the rubber part 3 is arranged in such a manner that, even during a high load capacity, there is a cardanic flexibility with little restoring torque between the inner part 1 and outer part 2 is possible.

Yet another aspect of the invention resides broadly in the fact that at least in one direction of compression, a rubber element 5 is provided for which is attached to the outer part 2 and which braces itself against inner part 1 by means of fluid.

An additional aspect of the invention resides broadly in the fact that the rubber element 5 has been developed into a ring-like form and together with metal part 6 and the outer part 2 form a chamber 7 which is filled with air and/or gas.

A yet additional aspect of the invention resides broadly in the fact that chamber 7 can be vented to the outside by means of a bore 8.

A yet further additional aspect of the invention resides broadly in the fact that the outer part 2 has been developed into two parts and that parts 2a and 2b are closely and solidly connected to each other.

A still further additional aspect of the invention resides broadly in the fact that the outer part 2 has a ring-like attachment flange 9.

Further yet another aspect of the invention resides broadly in an elastic rubber bearing consisting of an inner part, an outer part and a rubber part which is arranged with a distance in between, and that there is an inserted rubber part which together with the inner and outer part form a cavity which is filled with liquid, and is characterized by the fact that the transfer of force between the inner part 1 and the outer part 2 is primarily accomplished by means of fluid.

All of the patents, patent applications and publications recited herein, if any, are hereby incorporated by reference as if set forth in their entirety herein.

The invention as described hereinabove in the context of a preferred embodiment is not to be taken as limited to all of the provided details thereof, since modifications and variations thereof may by made without departing from the spirit and scope of the invention.

What is claimed is:

1. A bearing for being mechanically connected between a first object and a second object for transferring a force between the first object and the second object, said bearing comprising:

a housing element for being connected to the first object;

a substantially solid ball element for being connected to the second object;

said ball element having a ball-shaped portion;

said ball-shaped portion of said ball element being positioned in spaced-apart relation with and at least partially surrounded by said housing element;

said ball element defining a linear axis along a substantial line of symmetry of said bearing;

fluid in communication with said ball element and said housing element;

a sole, sealed fluid cavity formed at least by said ball element and said housing element, wherein said fluid is disposed within said fluid cavity;

said fluid at least partially surrounding a substantial portion of said ball-shaped portion of said ball element;

said fluid for at least transmitting a force between said ball element and said housing element when said ball element moves relative to said housing element;

a lower resilient element being vulcanized to said ball element and said housing element for at least transferring a force between said ball element and said housing element when said ball element moves in a first direction and when said ball element moves in a second direction;

an upper resilient element for being interposed between said fluid and said housing element for transmitting a force between said fluid and said housing element;

said upper resilient element being braced by said fluid to receive a force between said ball element and said housing element;

said bearing having at least one cross-section generally through said linear axis;

said fluid cavity comprising a substantial portion of said at least one cross-section;

said upper resilient element and said ball element being separated by a substantial distance; and said fluid cavity forming a substantial indentation in a portion of said lower resilient element.

2. The bearing according to claim 1, further comprising:

said ball portion of said ball element having a center;

said fluid cavity extending circumferentially about a portion of said ball portion of said ball element;

said fluid cavity having a maximum circumferential extent about said ball portion of said ball element;

said lower resilient element extending circumferentially about a portion of said ball portion of said ball element; and said lower resilient element having a minimum circumferential extent about said ball portion of said ball element.

3. The bearing according to claim 2, further comprising:

said indentation having an apex; and said apex of said indentation at least partially defining the maximum circumferential extent of said fluid cavity.

4. The bearing according to claim 3, further comprising:

said upper resilient element having plate reinforcement means disposed thereupon;

said plate reinforcement means being disposed to be in contact with said fluid; and said plate reinforcement means being for receiving a force between said ball element and said upper resilient element through said fluid.

5. The bearing according to claim 4, wherein said lower resilient element has a region of reduced thickness defined by said indentation and said housing element.

6. The bearing according to claim 5, wherein said housing element and said upper resilient element define chamber means for receiving and discharging a gas.

7. The bearing according to claim 6, including vent means for being in fluid communication with said chamber means and the ambient atmosphere for transferring gas to and discharging gas from said chamber means.

8. The bearing according to claim 7, wherein said upper resilient element is generally ring-shaped and connected to said housing element.

9. The bearing according to claim 8, wherein said upper resilient element has a central portion disposed between said plate reinforcement means and said chamber means.

10. The bearing according to claim 9, wherein said central portion of said upper resilient element has a generally convex shape oriented towards said chamber means.

11. The bearing according to claim 10, wherein said upper resilient element is vulcanized to said housing element.

12. The bearing according to claim 11, further comprising:

said housing element having an interior surface; and said housing element comprising at least one sheet overlay means being disposed on said interior surface.

13. The bearing according to claim 12, wherein said upper resilient element is disposed upon and vulcanized to a first of said at least one sheet overlay means.

14. The bearing according to claim 13, wherein said lower resilient element is disposed upon and vulcanized to a second of said at least one sheet overlay means.

15. The bearing according to claim 14, further comprising:

said ball element having an upper area and a lower area, wherein said upper area is located generally towards said upper resilient element and said lower area is located substantially opposite said upper area; and said lower resilient element having a region of tapered thickness towards said upper area of said ball element, wherein said region of tapered thickness is defined by said ball element and said indentation.

16. The bearing according to claim 15, wherein said indentation has two walls, wherein a first of said walls is formed by said region of tapered thickness of said lower resilient element and a second of said walls is formed by said region of reduced thickness of said lower resilient element.

17. The bearing according to claim 16, wherein said lower resilient element has a region of substantial thickness between said ball element and said housing element at said lower area of said ball element.

18. The bearing according to claim 17, wherein said lower resilient element and said ball element define at least one open cavity, wherein said at least one open cavity is disposed generally opposite said fluid cavity with respect to said lower resilient element.

19. The bearing according to claim 18, wherein at least a portion of said at least one open cavity forms a convex indentation in said lower resilient element.

20. The bearing according to claim 19, wherein said plate reinforcement means extends about a substantial portion of said ball portion of said ball element in a spaced-apart relationship with said ball portion of said ball element.

21. The bearing according to claim 20, further comprising:

at least a portion of said ball element being a ball pin;

said housing element comprising first and second external elements;

said first and second elements forming a junction;

sealing means being interposed at said junction for providing a seal between said first external element and said second external element;

a portion of said lower resilient element comprising a portion of said sealing means;

said sealing means comprising said lower resilient element having a sawtooth patterned surface within said junction;

said plate reinforcement means comprising a metal material;

said housing element comprising first mounting means for mechanically connecting said housing element to the first object;

said first mounting means being ring-shaped;

said ball element comprising second mounting means for connecting said ball element to the second object;

said second mounting means comprising thread means disposed within said ball element;

said first external element having a circular flange portion;

said second external element having a circular flange portion facing said circular flange portion of said first external element;

said circular flange portion of said first external element and said circular flange portion of said second external element forming at least a portion of said first mounting means;

at least one of said at least one sheet overlay means comprising a sheet metal material;

each of said first and second sheet overlay means having a first edge and a second edge;

the first edge of said first sheet overlay means being disposed within said junction;

the first edge of said second sheet overlay means being disposed within said junction;

a portion of said lower resilient element being disposed between said first sheet overlay means and said second sheet overlay means within said junction;

at least a portion of said lower resilient element comprising internal plate reinforcement means for strengthening said lower resilient element, wherein said internal plate reinforcement means is disposed within said lower resilient element between said ball element and said housing element;

each of said upper and lower resilient elements comprising an elastomer material;

said housing element comprising cylinder means; and said apex of said indentation being generally rounded.

* * * * *